May 28, 1946.  H. G. HUNTER  2,401,159
LOADING AND DUMPING DEVICE
Filed Feb. 8, 1945  3-Sheets-Sheet 1
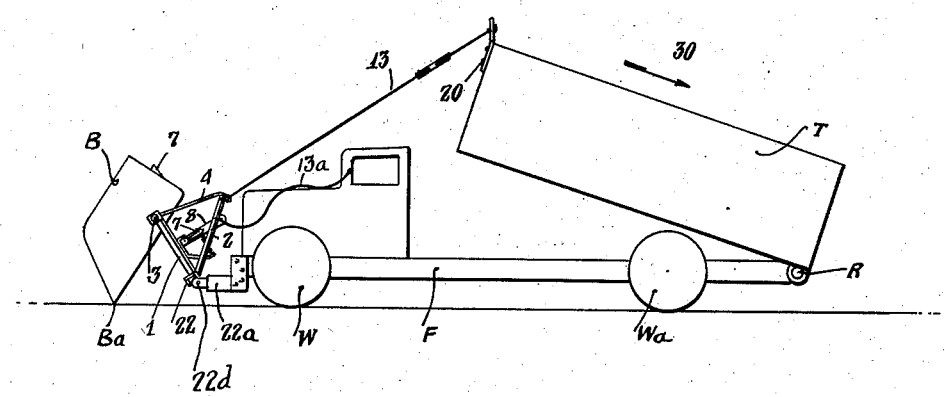
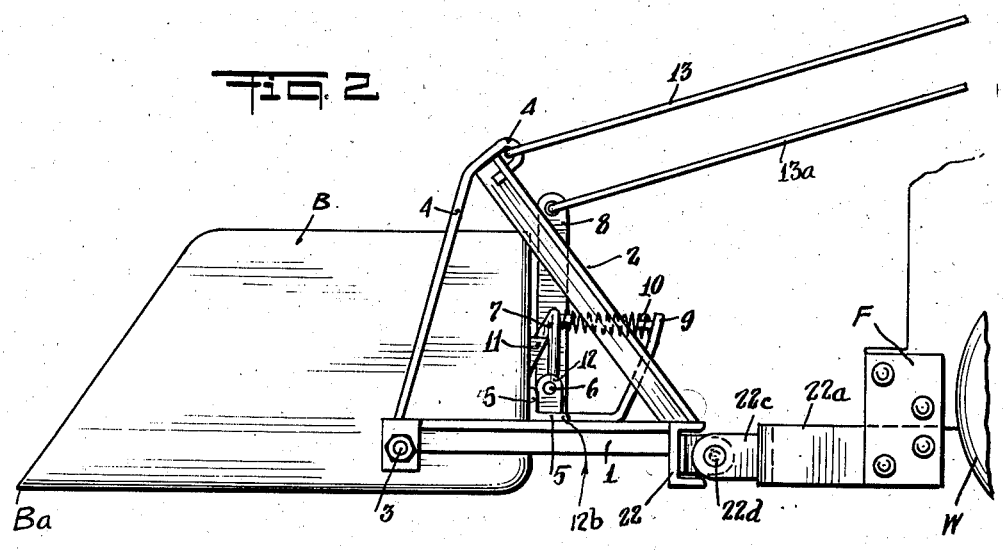
INVENTOR.
Henry G. Hunter
BY
ATTORNEYS

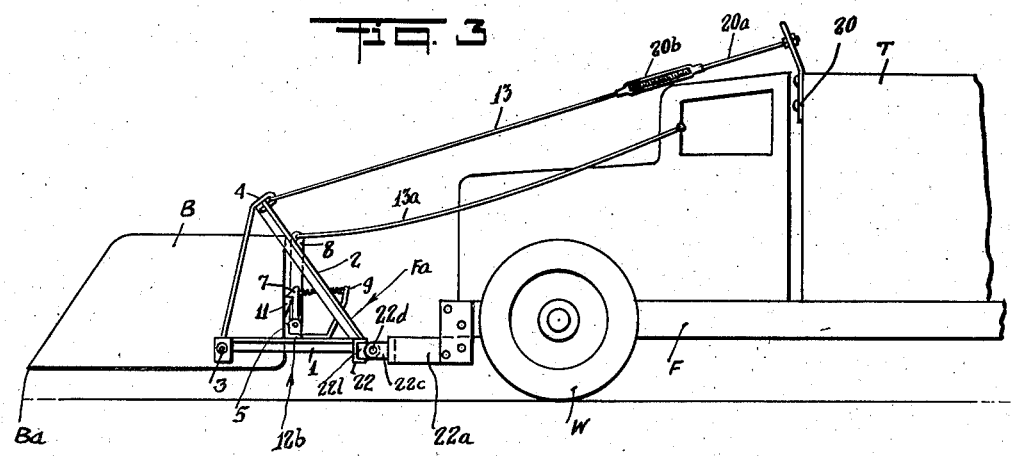
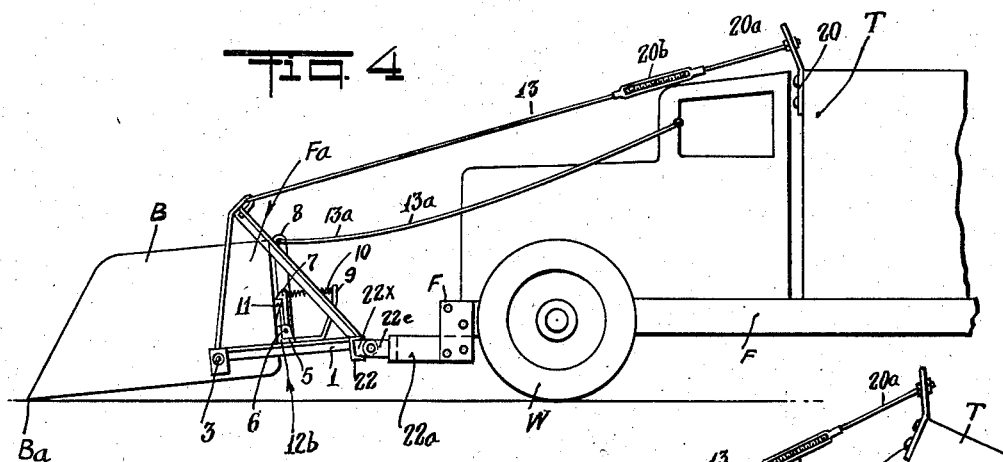
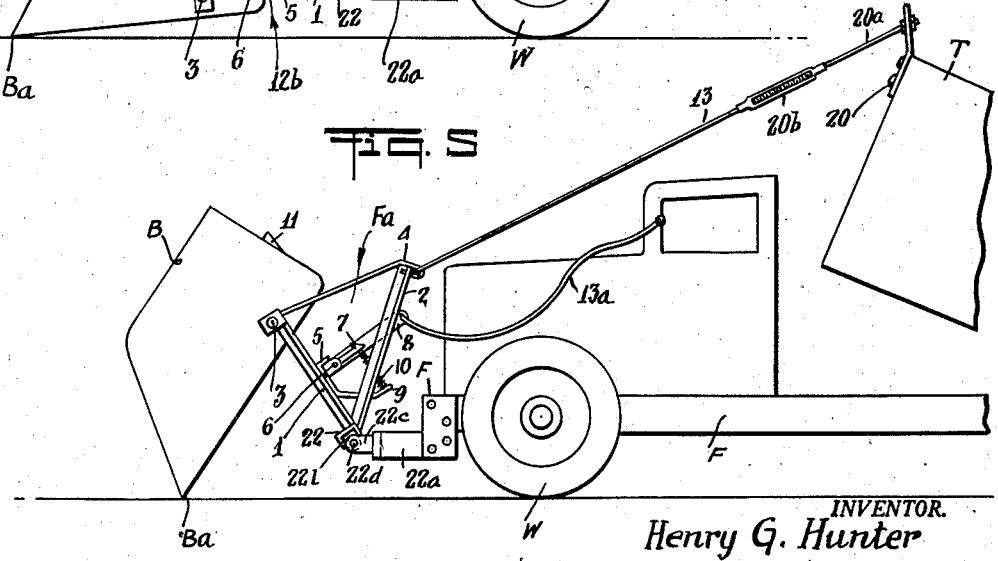

May 28, 1946.  H. G. HUNTER  2,401,159
LOADING AND DUMPING DEVICE
Filed Feb. 8, 1945      3 Sheets-Sheet 3
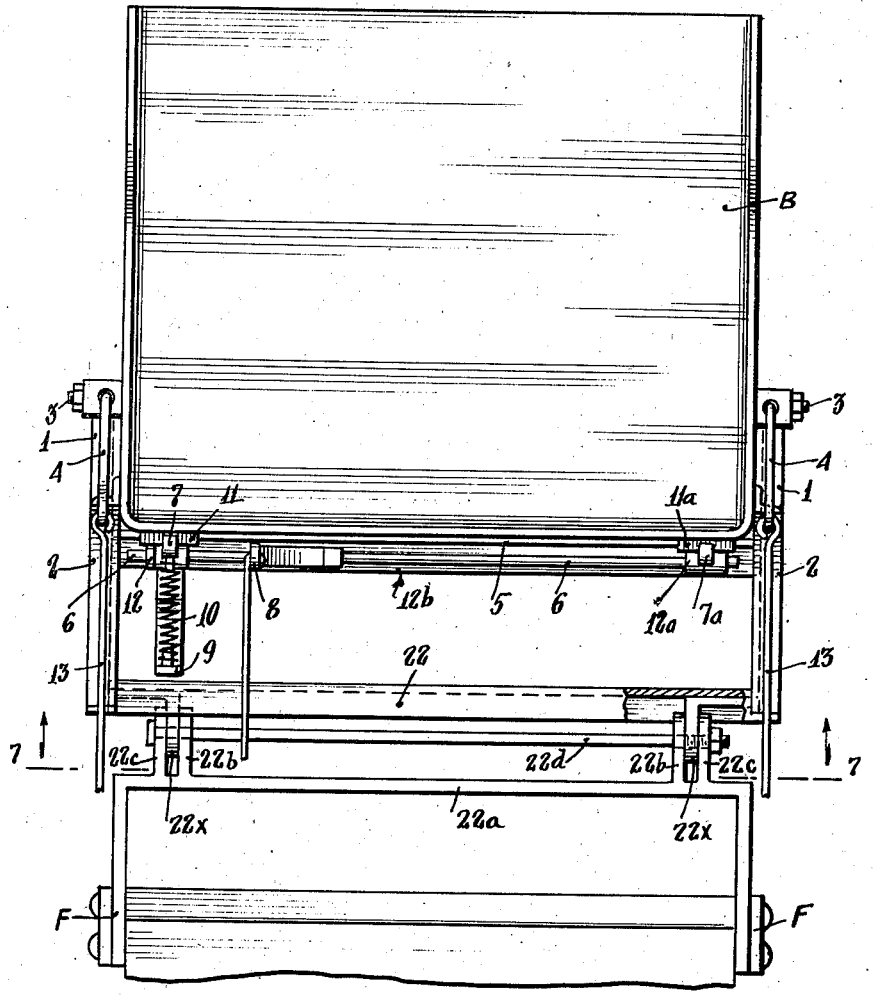
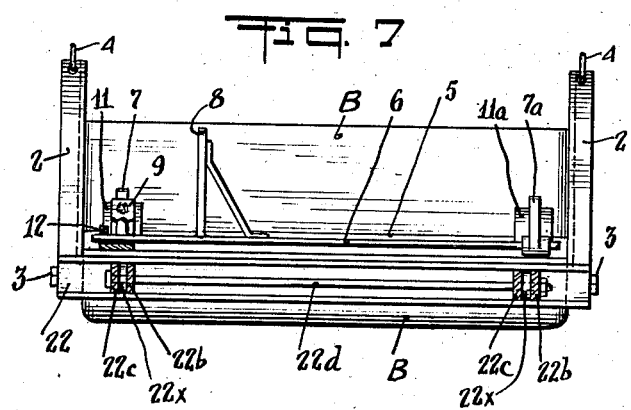
INVENTOR.
Henry G. Hunter
BY
ATTORNEYS Patented May 28, 1946

2,401,159

UNITED STATES PATENT OFFICE 2,401,159

LOADING AND DUMPING DEVICE

Henry G. Hunter, Potsdam, N. Y.

Application February 8, 1945, Serial No. 576,728

4 Claims. (Cl. 214—140)

My invention relates to a new and improved material-handling mechanism, which can be used for removing snow, gravel and other materials.

The principal object of my invention is to provide a simple attachment to a motor truck or other vehicle which has a dump-body which is pivoted to the chassis of the truck or other vehicle. This vehicle may be of the tractor type, or of any other type.

Numerous additional objects of my invention will be stated in the annexed description and drawings, which illustrate a preferred embodiment thereof.

Fig. 1 is a side elevation, showing the dump-body T and the bucket B, in the dumping or unloading position.

Fig. 2 is a detail side-elevation, on a scale larger than Fig. 1, showing the bucket B in a carting or transporting position.

Fig. 3 is similar to Fig. 2, on a smaller scale, showing one position of the dump-body T, in the carting position of bucket B.

Fig. 4 is similar to Fig. 3, showing the preferred loading position of bucket B.

Fig. 5 is similar to Fig. 1, on a larger scale.

Fig 6 is a detail plan view showing the bucket fixed to frames Fa by the latches 7 and 7a.

Fig. 7 is similar to Fig. 6, showing the bucket released from said frames Fa and from said latches, the bucket being shown in its dumping position.

The invention is applied to a conventional dump-truck which has a chassis F, front wheels W, rear wheels Wa, and a dump-body T whose rear end is pivotally connected to chassis F by pivots R. For convenience, said pivots R are designated as first pivot-means. Such dump-trucks are well known per se. They are motor driven, and the dump-body T can be tilted upwardly from its horizontal position to the position of maximum tilt shown in Fig. 1, or to any intermediate position. This is done by mechanism which is operated by a motor, such as the motor of the truck, and said body T can be held in any tilted position. All these details are well known per se, and require no illustration or further description.

As shown in Fig. 6, the chassis F has a U-shaped and rigid longitudinal extension 22a, rigidly fixed to said chassis F.

The front lateral bar of extension 22a has respective pairs of longitudinal lugs 22b and 22c.

A lateral and rigid channel bar 22 has rearwardly extending lugs 22x which are rigidly fixed to said bar 22.

Each lug 22x is located between a respective pair of lugs 22b and 22c.

The lugs 22x are turnably connected to the respective lugs 22b and 22c, by a lateral pivot pin or shaft 22d. For convenience, said member 22d is designated as second pivot-means.

Channel bar 22 is part of two rigid frames Fa, each of which includes longitudinal angle bars 1, forwardly inclined angle bars 2, and rearwardly inclined bars 4. The adjacent ends of bars 1, 2 and 4 of each frame Fa are rigidly fixed to each other, and bars 1 and 2 of each frame are rigidly fixed to channel bar 22.

There are two identical and parellel frames Fa, each said frame being fixed to lateral channel bar 22, so that both frames Fa turn in unison with channel bar 22, around the axis of said second pivot-means, namely, the axis of pivot rod or shaft 22d.

Bucket B is located between the two frames Fa. Said bucket B is turnably connected to frames Fa, by respective pivots 3. For convenience, said pivots 3 are designated as third pivot-means.

Bucket B is open at its front and it has an upstanding rear wall and upstanding side walls. The bottom wall of bucket B has a free front edge Ba.

Said rear wall of bucket B has rearwardly extending holding-projections or holding means 11 and 11a, which are wedge-shaped.

A lateral bar 12b is fixed to the longitudinal bars 1 of the two frames Fa. This bar 12b is an angle bar and it has flanges or legs 5. A shaft 6 is turnably mounted in bearings 12 and 12a which are fixed to bar 12b. The hubs of latches 7 and 7a are fixed to shaft 6. A spring-holding bar 9 is also fixed to lateral bar 12b. One end of compression spring 10 is fixed to bar 9. The other end of spring 10 is fixed to latch 7. This spring biases the latches 7 and 7a to their operative positions.

Latch-operating bar 8 is fixed to shaft 6. One end of rope or cable 13a is fixed to bar 8. The other end of cable 13a is fixed to a front-body-portion of the vehicle, near the seat of the driver, so that cable 13a can be conveniently pulled to release the bucket B from the latches 7 and 7a, This front-body-portion is fixed to the chassis F in the usual manner.

When bucket B is latched and thus fixed to frames Fa, bucket B turns in unison with frames Fa, around the axis of pivot rod or shaft 22d.

When the driver pulls cable or rope 13a, the latches 7 and 7a are moved rearwardly and out of operative position. The force of gravity then turns the empty or filled bucket B, counterclockwise relative to frames Fa.

The top of each frame Fa above the second pivot-means 22d, is adjustably fixed to the top of the front of dump-body T, by rods or ropes or cables 13, turnbuckles 20b, rods 20a and 20. Rods 20 are fixed to the front wall of dump-body T.

The turnbuckles 20b can be adjusted, so that when the dump-body T is horizontal, the bottom-wall of bucket B can be horizontal as shown in Fig. 3, or said bottom-wall may be downwardly tilted as shown in Fig. 4, or said bottom wall may then be even upwardly tilted. This depends upon the height of the pile of snow or other material, and whether it is desired to attack the pile of material at its bottom or above its bottom, and the angle of slip of the material which is to be handled. In Fig. 4, the free edge Ba of the bottom wall of the bucket touches the ground.

If desired, when bucket B is in the position of Fig. 3 or Fig. 4, or in any selected loading position, dump-body T may then be in a loading position in which said dump-body T may be horizontal, or said dump-body T may then be tilted above its horizontal position, but below the maximum upwardly tilted position of Fig. 1. This also depends upon the angle of slip of the snow or other material. All this can be regulated by adjusting the turnbuckles 20b.

Any type of releasable latch or lock can be provided between bucket B and frames Fa.

Pivots 3 are located below shaft 6.

When the bucket is in loading position, as in Fig. 4, the dump-body T being then horizontal or upwardly tilted to any desired angle, the vehicle is driven forwardly, so that bucket B is loaded with the material. The position of the bucket B in Fig. 4 is the preferred loading position. In said loading position, the rear wall of bucket B abuts the upstanding flange or leg 5 of the rigid bar 12b, which takes up the thrust on bucket B which results from the loading of the material. The pivots 3 are close to the bottom wall of bucket B. Hence the loading thrust on bucket B, keeps it latched by the latches 7 and 7a. It is necessary merely to drive the truck forwardly to fill bucket B while it is in a loading position, thus eliminating hoists and the like.

After the bucket has been loaded, the dump-body T can be tilted upwardly from the loading position which it had during the loading operation, to a carting position, until the bottom wall of bucket B is horizontal or upwardly tilted, depending upon the angle of slip of the material.

In order to dump the material from bucket B, it is released from the latches 7 and 7a. If desired, and before releasing bucket B from the latches, the body T can be tilted upwardly to a dumping position above its loading position and above its carting position, such as to the position of Fig. 1. When bucket B is thus released from the latches, gravity will automatically turn the bucket B to its unloading position.

The dump-body T is an example of an actuating member which is turnably connected to the chassis F. In effect, the frames Fa and bar 22 constitute a single supporting device or frame-device which is turnably connected to the chassis F, and to which the bucket B is turnably connected and releasably locked.

During the loading of the bucket B, the upstanding flange 5 of the bar 12b acts as a stop, to prevent the bucket B from turning relative to its supporting-device or frame-device, in a direction in which the free front edge Ba would be elevated. This eliminates any longitudinal thrust upon the latches. When the loaded bucket B is released from its supporting-device or frame-device, said bucket B can turn relative to its supporting-device or frame-device, only in a direction in which said free edge Ba is lowered. The third pivot-means 3 are located forwardly of the second pivot-means 22d.

I have described a preferred embodiment of my invention, but numerous changes and omissions and additions can be made without departing from its scope.

I claim:

1. In combination with a vehicle which has a chassis and a dump-body which is pivoted to said chassis at the rear of said dump-body, a frame-device located in front of said chassis, said frame-device being turnably connected at its rear by pivot-means to said chassis, connecting means which are fixed to the front of said dump-body and which are also fixed to said frame-device above said pivot-means so that said frame-device is turned in unison with said dump-body to raise the front end of said frame-device when the front of said dump-body is elevated, a bucket which is turnably connected to said frame-device, said bucket having an open front end and having an upstanding wall at its rear end, and having a bottom wall which has a front free edge, releasable locking means which releasably lock said bucket to said frame-device, said free edge being elevated when said bucket is moved in unison with said frame-device when said front of said dump-body is elevated, said bucket being mounted to turn by gravity relative to said frame-device to lower said free edge when said bucket is released from said frame-device.

2. In combination with a truck which has a chassis and a dump-body which is pivoted at its rear end to said chassis, longitudinal frame-members located in front of the front end of said chassis, said frame members extending in front of said chassis, said frame members being rigidly connected to each other by lateral connecting means, said frame-members being turnably connected at their bottom rear ends to said chassis, said frame-members being connected at their tops to the front wall of said dump-body so that said frame-members are turned relative to said chassis when said dump-body is turned relative to said chassis, a bucket located between said frame-members, said bucket having an open front end and an upstanding wall at its rear end and a bottom wall which has a front free edge, said bucket being turnable relative to said frame-members substantially only in a direction in which said free end is lowered, and movable latch means connected to said lateral connecting means and releasably locking said bucket to said frame-members, said free end being elevated when the front wall of said dump-body is elevated, said bucket being mounted to turn by gravity relative to said frame-members to lower said front free edge when said latch means release said bucket from said frame-members.

3. In a vehicle which has a chassis and a front body-portion which is fixed to said chassis at the front thereof and which has a dump-body which is located rearwardly of said front body-portion, said dump-body being turnably connected at its rear end by first pivot-means to said chassis, said chassis having a front extension which extends forwardly of said front body-portion, frame-means turnably connected by second pivot-means to said extension forwardly of said chassis and of said front body-portion, said frame-means being located wholly forwardly of said chassis and said front body-portion, a bucket turnably connected to said frame-means by third pivot-means which are located forwardly of said second pivot-means, said bucket being located forwardly of said chassis and said front body-portion and having a free edge at its front end and having upstanding side walls and an upstanding rear wall, latch means movably connected to said frame-means, said latch-means being adapted and operative to hold said bucket fixed to said frame-means when said latch-means are in operative position, said latch-means being movable relative to said frame-means and said bucket to an inoperative position in which said bucket is free to turn relative to said frame-means, connecting-means which connect said frame-means above said second pivot-means to said dump-body forwardly of said first pivot-means, said connecting-means being operative and adapted to raise said free edge when said bucket is fixed to said frame-means and said dump-body is tilted upwardly relative to said chassis.

4. In a vehicle which has a chassis and a front body-portion which is fixed to said chassis at the front thereof and which has a dump-body which is located rearwardly of said front body-portion, said dump-body being turnably connected at its rear end by first pivot-means to said chassis, said chassis having a front extension which extends forwardly of said front body-portion, frame-means turnably connected by second pivot-means to said extension forwardly of said chassis and of said front body-portion, said frame-means being located wholly forwardly of said chassis and said front body-portion, a bucket turnably connected to said frame-means by third pivot-means which are located forwardly of said second pivot-means, said bucket being located forwardly of said chassis and said front body-portion and having a free edge at its front end and having upstanding side walls and an upstanding rear wall, latch-means movably connected to said frame-means, said latch-means being adapted and operative to hold said bucket fixed to said frame-means when said latch-means are in operative position, said latch-means being movable relative to said frame-means and said bucket to an inoperative position in which said bucket is free to turn relative to said frame-means, connecting-means which connect said frame-means above said second pivot-means to said dump-body forwardly of said first pivot-means, said connecting-means being operative and adapted to raise said free edge when said bucket is fixed to said frame-means and said dump body is tilted upwardly relative to said chassis, said frame-means having a stop which abuts said rear wall when said bucket is held fixed to said frame-means by said latch-means, said latch-means being rearwardly moved relative to said rear wall when said latch-means are moved to inoperative position, said rear wall having holding-means which are engaged by said latch-means when said latch-means are in operative position.

HENRY G. HUNTER.